HYBRID RING STRUCTURE FOR REVERSING THE PHASE OF AN RF SIGNAL IN ACCORDANCE WITH THE LEVEL OF A TWO-VOLTAGE LEVEL SIGNAL PRODUCING MEANS

Filed Feb. 15, 1963 2 Sheets-Sheet 1

INVENTORS
ERNEST S. LEVY
JOHN C. BRONAUGH
ALEX D. CHRISTIE

BY Hoyt S. Mills Jr.

HYBRID RING STRUCTURE FOR REVERSING THE PHASE OF AN RF SIGNAL IN ACCORDANCE WITH THE LEVEL OF A TWO-VOLTAGE LEVEL SIGNAL PRODUCING MEANS

Filed Feb. 15, 1963

INVENTORS
ERNEST S. LEVY
JOHN C. BRONAUGH
ALEX D. CHRISTIE

BY Lloyd L. Mellis Jr.

United States Patent Office 3,346,822

Patented Oct. 10, 1967

3,346,822

HYBRID RING STRUCTURE FOR REVERSING THE PHASE OF AN RF SIGNAL IN ACCORDANCE WITH THE LEVEL OF A TWO-VOLTAGE LEVEL SIGNAL PRODUCING MEANS

Ernest S. Levy, San Diego, and John C. Bronaugh, Escondido, and Alex D. Christie, San Diego, Calif., assignors to Cubic Corporation, San Diego, Calif., a corporation of California Filed Feb. 15, 1963, Ser. No. 258,928
6 Claims. (Cl. 333—7)

The present invention relates to a phase reversal modulator and, more particularly, to a modulator circuit which is electronically controlled to reverse or not reverse the phase of a R-F signal at megacycle rates.

One electronic requirement arising in the system described in the co-pending U.S. application for patent, entitled, "A Secure Distance Measuring and Data Transmission System," Ser. No. 259,188 filed on Feb. 18, 1963, to Ernest S. Levy, John R. Grace, Raymond L. de Kozen and Arthur E. Noyes, as co-inventors, and having a common assignee with the present application for patent, is that of controlling the phase of an outgoing carrier signal in 180° steps, i.e., reversing or not reversing its phase in accordance with a pseudo-random code, generated at an approximate 8 mc. clock rate.

The primary purpose of phase-reversing the carrier signal in accordance with the pseudo-random code in the system of the above identified application for patent is to effectively spread the transmitted signal over a spectrum of approximately 20 mc. such that it appears similar to white or Gaussian noise. By employing this energy dispersion process, the transmitted signal is made relatively secure from detection by third parties. Additionally, the system's signal offers little or no interference to CW signals lying within the same frequency band owing to the small amount of transmitted signal energy existing at any particular frequency.

The present invention pertains to a phase reversal modulator which is capable of phase reversing an R-F carrier signal as required in the system described in the above noted application for patent. In particular, a hybrid ring, having four tap points or junctions is employed, a first pair of the junctions being spaced $\gamma/2$ and $\gamma$ wave lengths, respectively, from each other measured around the two paths of the ring where $\gamma$ is the wave length of the carrier signal to be switched.

One of the remaining pair of junctions is positioned midway between the first junction pair along the $\gamma/2$ dimensioned path and hence is spaced $\gamma/4$ wave lengths from each of the initial pair of junctions. The remaining junction is positioned $\gamma/4$ wave lengths from the first junction along the longer or $\gamma$ lengthed path.

The carrier signal source and the output load or antenna are coupled to the respective first pair of junctions. The pair of output complementary signals from a flip-flop, triggered in accordance with the desired carrier signal phase reversal pattern, are employed to drive a pair of current switches, in turn, connected through respective diodes to the remaining pair of respective junctions.

One or the other of the two current switches is always driven to conduction by its associated flip-flop signal, the particular conducting switch being determined by the conduction state of the flip-flop. A D-C current accordingly passes through the diode associated with the conducting switch to the hybrid ring with the result that the forward resistance of the diode is lowered to a very small value. With this low diode resistance condition in existence, the corresponding junction point reflects a high impendence path, corresponding to an open circuit, to the R-F carrier energy, injected $\gamma/4$ wave lengths away, with the result that its principal energy travels around the opposite leg of the hybrid ring to the load. This occurs since the diode associated with the junction in this other leg and connected to the other current switch is at its high impedance ar non-conducting mode and hence offers effectively no low shunt impedance to R-F energy flow.

Upon reversal of the flip-flop conduction state, the operation of the two diodes is reversed and the input R-F energy is routed around the other leg of the hybrid ring to the load. In one instance, this distance traveled by the carrier signal is $\gamma/2$ wave lengths, and in the other case the distance is $\gamma$ wave lengths. Hence, the carrier signal will be reversed 180° in phase between the input and output junctions in the first case, and will be reversed 360°, corresponding to 0° or no effective phase shift, in the other case. Hence, by controlling the conduction state of the flip-flop, the output carrier signal going to the load is either reversed or not reversed in phase.

Mechanization of the technique is readily accomplished by employing strip-line techniques in which the hybrid ring, junctions, etc., appear as conductive paths on a pair of matching etched circuit boards. The linear dimensions of the various paths correspond to their particular required wave lengths based on the particular R-F signal frequency. The two diodes are inserted within suitable openings made in the two boards and are sealed in place by metal shields, after the boards have been interconnected face to face. The input/output and switching leads to the assembly are taken through appropriate connectors, and the outer surfaces of the boards are copper covered and grounded, in accordance with established stripline techniques.

It is accordingly the principal object of the present invention to provide a phase reversal modulator capable of switching the phase of an R-F signal at megacycle rates.

Another object of the present invention is to provide a phase reversal modulator capable of selectively reversing or not reversing the phase of an R-F signal in accordance with the output conduction state of an associated flip-flop.

A further object of the present invention is to provide a phase reversal modulator which includes a hybrid ring connected between an R-F signal input and output load in which the two paths of the ring between the input and output are so arranged relative to the frequency of the R-F signal that an open circuit connection alternately made between the two halves cause alternate phase shift of the carrier signal in going from the input source to the output load.

Another object of the present invention is to provide a selective phase shifter including a hybrid ring connected between a load and a source of carrier signals in which alternate legs of the hybrid ring may be selectively open-circuited to provide alternate paths, and hence different phase shifts between the carrier signal source and the load.

Still another object of the present invention is to provide a phase reversal modulator hybrid ring connected between a load and a source of R-F signals such that one of the ring path provides no effective phase shift in the R-F signal going to the load and the other path provides a 180° phase shift in the R-F signal, in which the paths of the hybrid ring may be alternately open-circuited in accordance with the state of a flip-flop whereby the carrier signal may be selectively phase reversed or not in accordance with a series of binary digits passed into the flip-flop.

Still another object of the present invention is to provide a phase reversal modulator capable of either passing an R-F signal without an effective phase change or reversing the phase of the signal by 180° in accordance with the conductor state of an associated input flip-flop.

A further object of the present invention is to provide a phase reversal modulator capable of reversing or not reversing the phase of a high frequency carrier signal in accordance with the conduction state of an associated flip-flop for spreading the bandwidth of the carrier signal over an appreciable spectrum.

Other objects, features and attendant advantages of the present invention will become more apparent to those skilled in the art as the following disclosure is set forth, including a detailed description of the preferred embodiment of the invention as illustrated in the accompanying sets of drawings, in which.

Figure 1:
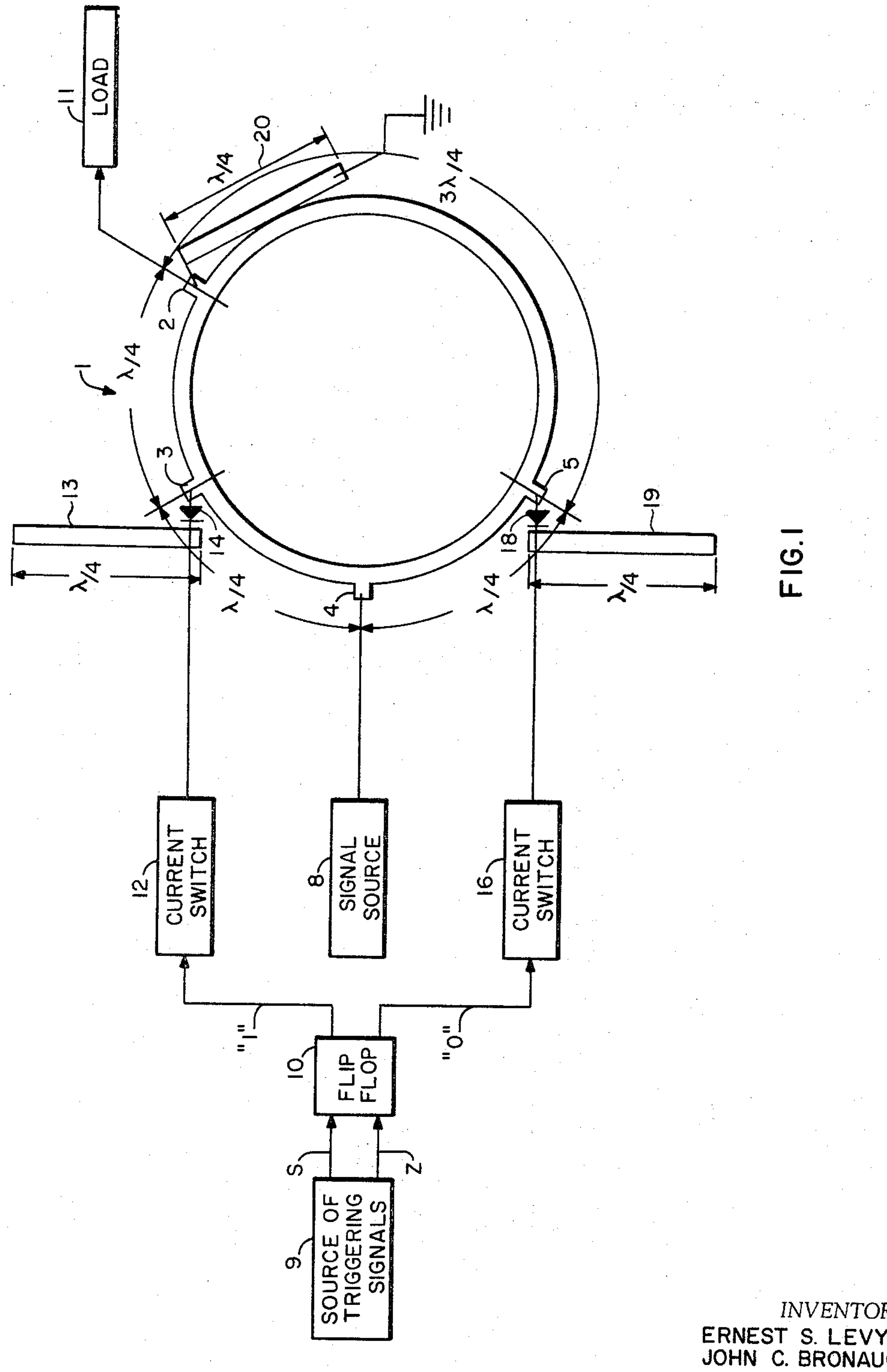
FIGURE 1 is a partly schematic and partly block diagrammatic representation of the present invention.

Referring now to the drawings wherein the same circuit elements are given identical numerical designations throughout the several figures, there is illustrated in FIGURE 1 in schematic form the phase reversal modulator according to the present invention. In particular, a hybrid ring is indicated schematically at 1, with four tap or junction points 2, 3, 4 and 5. Points 4 and 2 are separated by $\lambda/2$ wave lengths in one direction and by $\lambda$ wave lengths in the other direction. Junction 3 is located midway between junctions 2 and 4 along their shorter path length and hence is separated by $\lambda/4$ from each. The final junction 5 is located $\lambda/4$ away from junction 4 toward the junction 2 in the other path between junctions 2 and 4. A source 8 of an R-F carrier signal has its output signal applied to terminal 4 on the hybrid ring while an external load 11 which, for example, may be an antenna, is coupled to terminal 2.

A flip-flop 10 including set and zero input terminals designated S and Z respectively, produces a pair of complementary output signals designated "1" and "0." A source of flip-flop triggering signals is indicated at 9 and supplies triggering signals to the S and Z input terminals of flip-flop 10. As noted earlier, this source of triggering signals may comprise, for example, a pseudo-random code generator whose output code sequence of 1's and 0's is to control the phase reversing of the carrier signal source 8. The "1" output signal of the flip-flop is applied to a current amplifier, or switch, 12 whose output signal, in turn, is passed through a diode 14 to terminal 3 of the hybrid ring. In addition, a quarter-wave length stub 13 is coupled to the output terminal of current switch 12.

The "0" output teminal of flip-flop 10 is coupled to another current switch 16 whose output signal is passed through a diode 18 to junction 5 of the hybrid ring. As before, a quarter wave length stub 19, is attached to the output terminal of switch 16. A final quarter wave length stub 20 is coupled from junction 2 to ground.

In considering the operation of the phase reversal modulator, assume that flip-flop 10 has been triggered to be in its "1" state, i.e., the voltage appearing on the "1" output line of the flip-flop represents the binary value "1." Further, assume that the voltage and current parameters of both flip-flop 10 and the pair of current switches are such that, for this particular conduction state of flip-flop 10, the output signal of current switch 12 is of negative polarity while the output signal of current switch 16 is either of zero magnitude or positive in polarity. Under this condition, a D-C current will flow from current switch 12 through diode 14, hybrid ring 1, stub 20 to ground. Hence, diode 14 will conduct and place junction 3 of the hybrid ring at R-F ground. The resulting reflected impedance from this point back to input makes the junction appear as an open circuit to the applied R-F energy. On the other hand, owing to the assumed ground or positive potential of the output signal from current switch 16, diode 18 is back-biased from ground and hence behaves as a very high shunt impedance to the hybrid ring hence offering substantially no impedance to the serial flow of R-F energy from source to load 11 in its own associated hybrid ring arm to load 11. Hence, all energy will flow along this lower path of the hybrid ring from the source to the load and experience a $\lambda$, or 360° phase shift, which, of course, represents no effective or 0° phase shift.

On the other hand, when flip-flop 10 is triggered to its opposite conduction state with the voltage on its "0" output conductor representing a binary "1," current switch 16 is activated while current switch 12 is cut off. Under these signal conditions, D-C current will flow serially from ground, stub 20, hybrid ring 1, diode 18 to current switch 16, which is the reverse of the previously explained case, diode 18 is conducting while diode 14 is open-circuited. The R-F signal from source 8 will accordingly be presented with a high impedance or open circuit impedance at junction 5 and will be presented with no impedance at junction 3. Hence, R-F energy will flow from terminal 4 to junction 2 by way of junction 3, the total distance being $\lambda/2$. Accordingly, the carrier signal will be reversed 180° in phase in its travel through the hybrid ring.

Quarter-wave stub 20, at the load junction, in addition to serving as a D-C ground for the hybrid ring 1 reflects a very high impedance to any applied R-F energy, hence serving to channel all R-F energy into load 11. At the same time, the open circuit stubs 13 and 19, which are associated with current switches 12, 16, respectively, are normally isolated from the ring 1 when their associated diodes 14, 18 are non-conducting.

In brief summary, then, it is readily seen that the phase of the carrier signal at the output load will be in phase with that produced at the source when flip-flop 10 is at its "1" condition and will be 180° reversed therefrom when flip-flop 10 is at its "0" condition. Hence, by properly triggering flip-flop 10 in accordance with a desired pattern, such as serial digital information, a pseudo-random noise code, etc., it is possible to reverse and not reverse the phase of the passed carrier signal directly in accordance with the "1" and "0" values represented by the flip-flop 10 output values.

Figure 3:
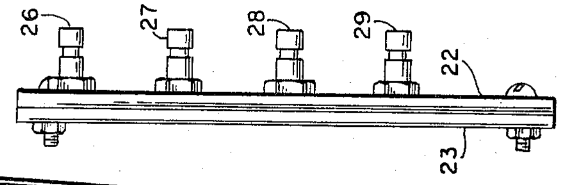
FIGURE 3 is a top view of the FIGURE 2 stripline embodiment shown in its assembled position.
Figure 2:
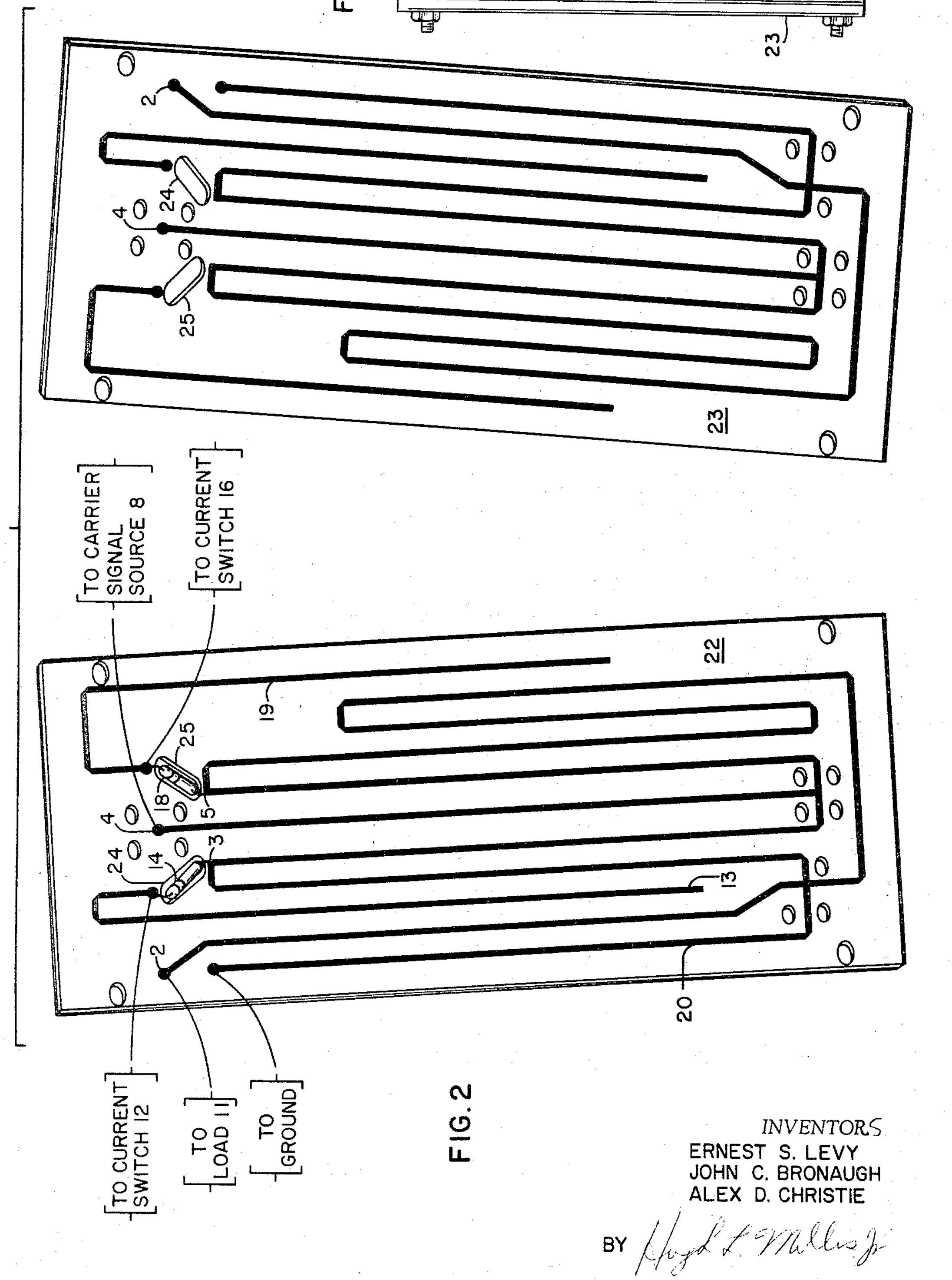
FIGURE 2 represents an embodiment of the present system employing stripline techniques in which two etched circuit plates are shown separated.

Reference is now made to FIGURE 2 and 3 in which a preferred embodiment of hybrid ring 1 is illustrated in which stripline techniques are employed. In particular, a pair of etched circuit boards 22 and 23 are illustrated in a separated, open face position for better illustrating their conductive paths and diode placement. Board 22, as will be seen, includes a series of conductive paths, left by the etching process, which serve to form hybrid ring 1, previously shown schematically in FIGURE 1, including various associated junctions and quarter-wave stubs.

The pair of diodes 14 and 18 are inserted into a respective pair of cut-outs, 24 and 25. The upper ends, viewed from FIGURE 2, of the two diodes are connected to a respective pair of connectors, 27 and 29, best seen in profile from FIGURE 3. The other ends of these diodes are connected to junctions 3 and 5, respectively, from FIGURE 1, which are represented in this FIGURE 2 as slightly enlarged areas of the conductive plating left on plates 22 and 23 following the etching process.

Conductive path 20 is taken from junction 3 and its end point is connected to ground by soldering a conductive connection to it, passing the connection through a hole drilled in the board, and conductively connecting the other end of the connection to the metal sheet not specifically shown in this figure, covering the back side of the board. This metal sheet, in turn, will be grounded by the input connections made to its various connectors, as described shortly.

Also, another conductive path or strip is taken from terminal 3 to terminal 4, in turn, connected to connector 28 in FIGURE 3. Junction 5, connected to the other end of the diode 18, is connected, partly through a strip common with terminal 3 to junction 4. The other path leading from junction 5, after making several loops, ends up at terminal 2, in turn, connected to connector 26 in FIGURE 3. As will be also seen, the diodes 14 and 18 upper connection points are connected to one-quarter wave length strips 13 and 19 respectively.

It will be seen that the etched patterns on board 22 and 23 are complementary to each other, such that when the boards are fitted together, exact matching will occur between all junctions and the striplines. The boards are preferably of a copper clad plastic configuration, with a gold flash applied to the copper to both improve the R-F conductivity of the metal, optimize the conductive contact between adjacent metal surfaces where the two boards are placed in their final mating position, and prevent corrosion of the copper.

FIGURE 3 is the top view of the final assembly of boards 22 and 23 including the addition of connectors 26, 27, 28, and 29 connected as described earlier to the various conductive paths. The two boards are held in fixed relationship to each other by a series of nuts and bolts, not specifically designated. Also, a pair of conductive plates or shields, not specifically shown, are preferably placed over the openings 24 and 25, holding diodes 14 and 18, respectively, which are conductively attached to the copper plate on the outside of the boards.

The linear dimensions of the various paths must be related to wave length dimensions given earlier in FIGURE 1, which, in turn, are based on the frequency of the applied R-F signal. Hence, any particular board configuration will be suitable for one particular frequency and any change of frequency will require another board pair having appropriate lengthened or shortened conductive paths as based on the wave length of the new signal frequency.

As will be appreciated by those skilled in the art, the particular configuration shown in detail in FIGURES 2 and 3, and employing stripline techniques represents only one form in which the technique generally illustrated in FIGURE 1 may be mechanized. For example, ordinary coaxial cable could be employed for forming the hybrid ring 1, and other types of in-and-out junctions, as appropriate to coaxial lines, would be employed at the various junction points. It will also be appreciated that many variations of the specific conductor configurations shown for plates 22 and 23 in FIGURE 2 may be made while retaining the same length requirements without significantly altering the hybrid ring characteristics as is required for the system's operation in the manner described.

It will further be appreciated that a sizeable R-F signal frequency range is possible with the techniques herein disclosed, owing to the linear relationship between path dimensions and R-F signal wave lengths. That is, higher frequencies would require shorter path dimensions while lower frequencies would require longer path dimensions. It will also be appreciated, that the current switches and flip-flop driving signals from FIGURE 1 may take many alternative forms in detail without materially altering the scope of the present invention.

What is claimed is:

1. An electronic phase reversal modulator for controlling the phase shift of an R–F signal produced by an R–F signal source traveling to a load, said R–F signal having a predetermined wavelength, said electronic phase reversal modulator comprising: hybrid ring means having an effective circular dimension equal to one and one-half the wavelength of said R–F signal, said hybrid ring means including first, second, third and fourth junctions, said first and second junctions being spaced apart by one-half wavelength measured along one circular dimension of said hybrid ring means and one wavelength apart measured along the other circular dimension of said hybrid ring means, said third junction being positioned intermediate said first and second junctions along said one circular dimension, and spaced one-quarter of a wavelength from said first junction, said fourth junction being positioned along said other circular dimension and one-quarter wavelength from said first junction between said first and second junctions; signal producing means for producing first and second output signals, each of said first and second signals being either at a first or a second voltage level; first means for applying said first signal to said third junction, said first means being responsive to the first voltage level of said first signal for placing said third junction at an effective R–F open circuit impedance whereby the path of the R–F signal from said R–F signal source to said load is through said fourth junction and hence undergoes a phase shift corresponding to one wavelength, said one wavelength corresponding to no effective phase shift; and second means for applying said second signal to said fourth junction, said second means being responsive to said first voltage level of said second signal for placing said fourth junction at an effective R–F open circuit impedance whereby the path of the R–F signal from said R–F signal source to said load is through said third junction and hence undergoes a one-half wavelength phase shift, said one-half wavelength phase shift corresponding to a phase reversal of said R–F signal.

2. The electronic phase reversal modulator according to claim 1 in which said signal producing means includes electronic flip-flop means, said first and second output signals corresponding to the complementary output signals of said flip-flop means whereby said first and second output signals are always of opposite voltage levels.

3. The electronic phase reversal modulator according to claim 2 in which said first means includes first amplifier means for amplifying said first output signal produced by said signal producing means and said second means includes second amplifying means for amplifying said second output signal produced by said signal producing means.

4. The electronic phase reversal modulator according to claim 3 in which said first means includes, in addition, first diode means coupled between said first amplifying means and said third junction, the first voltage level of said first signal causing current conduction through said first diode means, and said second means includes, in addition, second diode means coupled between said second amplifying means and said fourth junction, the first voltage level of said second signal causing current conduction through said second diode means whereby the low forward resistance of either of said first and second diode means produces said effective R–F open circuit impedance.

5. The electronic phase reversal modulator according to claim 4 including, in addition, first and second one-quarter wavelength stub means connected between said first diode means and said first amplifying means and between said second diode means and said second amplifying means, respectively, in said first and second means, respectively, said first and second one-quarter wavelength stub means serving to prevent said R–F signal from entering said first and second amplifying means respectively.

6. The phase reversal modulator according to claim 5 including, in addition, third one-quarter wavelength stub means connected to ground said load to thereby furnish a ground return path for any current passed through either said first or said second diode means.

References Cited

UNITED STATES PATENTS

| | | | |
|---|---|---|---|
| 2,434,904 | 1/1948 | Busignies | 328—155 |
| 2,676,245 | 4/1954 | Doelz | 178—66 |
| 2,726,385 | 12/1955 | Moore | 343—16.1 |
| 2,825,057 | 2/1958 | Worthington | 333—11 X |
| 2,977,484 | 3/1961 | Sterzer et al. | 333—11 X |
| 3,131,367 | 4/1964 | Pitts et al. | 333—31 |
| 3,158,692 | 11/1964 | Gerkensmeier. | |

FOREIGN PATENTS

| | | |
|---|---|---|
| 658,003 | 2/1963 | Canada. |

OTHER REFERENCES

Pulse and Digital Circuits, Millman & Taub, 1956, p. 140, figures 5–1 (copy in Group 250) (Lib. No. TK 7835M55c.3).

HERMAN KARL SAALBACH, *Primary Examiner.*

P. L. GENSLER, *Assistant Examiner.*